(Model.)

E. J. DELAURIER.
APPARATUS FOR UTILIZING THE POWER OF WAVES.

No. 403,579. Patented May 21, 1889.

WITNESSES:
John M(?)pur.
T. Fred. Bourne.

INVENTOR
E. J. Delaurier
BY Briesen & Steele
ATTORNEYS

UNITED STATES PATENT OFFICE.

EMILE JOSEPH DELAURIER, OF PARIS, FRANCE.

APPARATUS FOR UTILIZING THE POWER OF WAVES.

SPECIFICATION forming part of Letters Patent No. 403,579, dated May 21, 1889.

Application filed June 23, 1886. Serial No. 206,033. (Model.)

*To all whom it may concern:*

Be it known that I, EMILE JOSEPH DELAURIER, of the city of Paris, France, have invented a new and useful Apparatus for Utilizing the Power of the Waves, of which the following is a full, clear, and exact description.

The invention relates to apparatus for utilizing the power of the waves. It has before been proposed to utilize the ebb and flow of the tide for storing in large reservoirs the water raised by the tide above low-water mark; but this system has not been practically successful, as it involved considerable expense, the results obtained were very irregular, &c.

By my invention I utilize the ascensional force of the water resulting from the rise of the waves, as well as their motion of translation. My rotary apparatus, which is designed for use in the sea, can therefore also be applied in any stream. It acts in such a way as to produce regular or uniform results from the irregular motion of the water, and the power obtained can be utilized *in situ* or be transmitted to a distance by mechanical or electrical means.

Reference is to be had to the accompanying drawings, forming part of this specification, in which—

Figure 1:
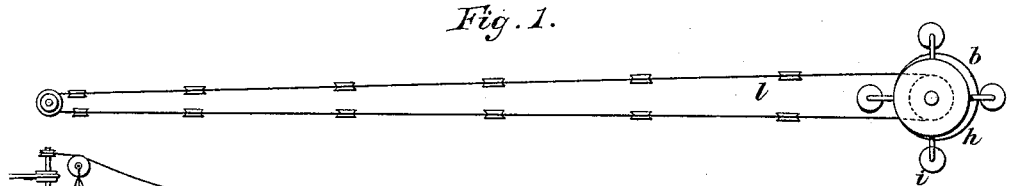
Figure 2:
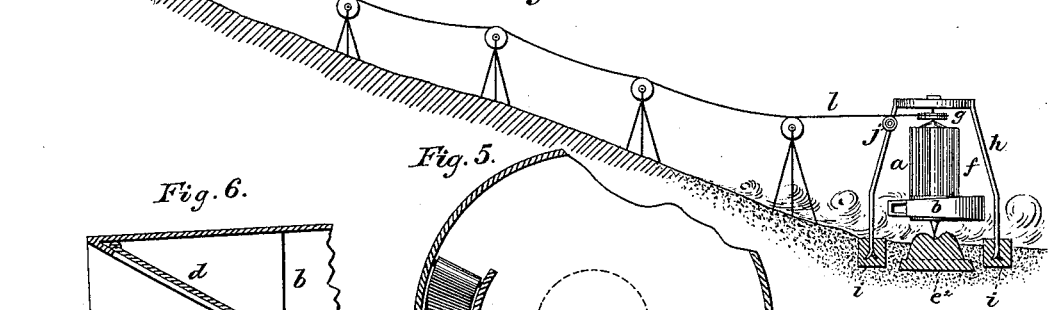
Figure 6:
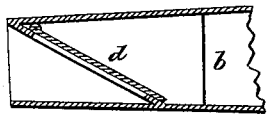
Figure 3:
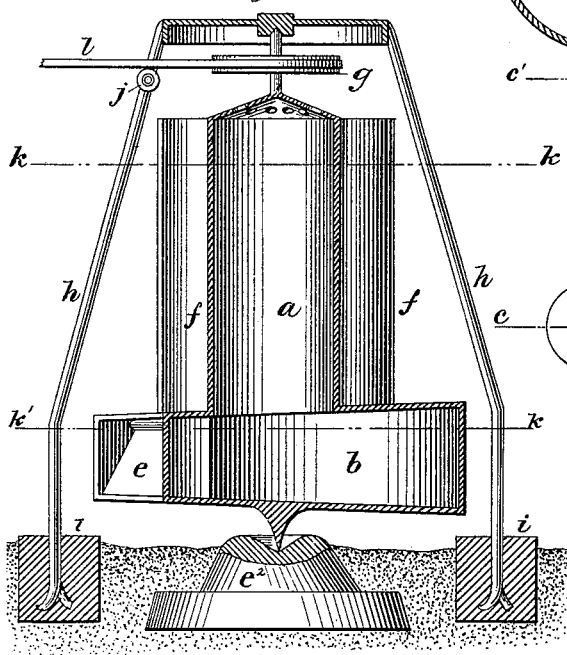
Figure 4:
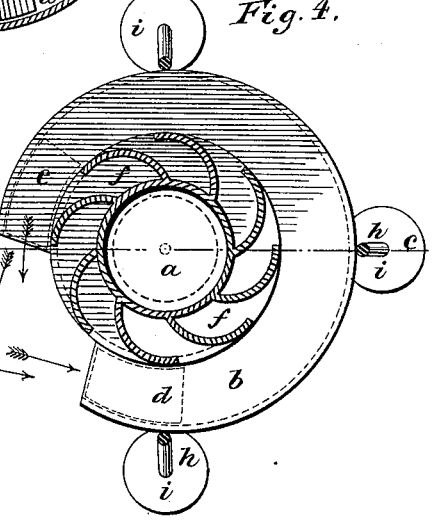

Figure 1 is a plan view of my apparatus when arranged for transmitting power, and Fig. 2 is a side elevation thereof. Fig. 3 is a vertical section, enlarged, on the line $c$ $c$, Fig. 4. Fig. 4 is a horizontal section, enlarged, on the line $k$ $k$, Fig. 3. Fig. 5 is a horizontal section, enlarged, on the line $k'$ $k'$, Fig. 3; and Fig. 6 is an enlarged detail section on the line $c'$ $c'$, Fig. 5.

The same letters of reference represent similar parts in all the figures.

The apparatus (which is mounted to turn on its own axis on a pivot supported in a footstep, $e^2$, and in a bearing in a frame, $h$, fixed in blocks $i$ $i$) is constructed as follows:

$a$ is a tube or chamber, and $b$ a tube carried by the chamber $a$, and that is in direct communication with said chamber. The tube $b$ is provided at one end with a valve, $d$, (see Figs. 5 and 6,) which permits water to enter the tube $b$ at one end and chamber $a$, but prevents its exit from said end. At the opposite end the tube $b$ is provided with a valve, $e$, that permits the exit of water from the tube $b$, but prevents its entering said tube. The apparatus is to be partially immersed in the water, and when the level of the water rises it will enter the tube $b$ at one end, and also the chamber $a$, and flows therefrom past the valve $e$ when the water falls. By this passage of the water into and then out of the tube and chamber rotary motion is imparted to the apparatus, first, when the water rises and enters the apparatus, which motion is then continued in the same direction when the water falls and passes from the apparatus. The rise and fall of the waves are thus utilized. Around the chamber or tube $a$ are disposed curved blades $f$, so arranged that the current acting thereon rotates the apparatus constantly in the same direction as that in which it is impelled by the rise and fall of the water.

$g$ is a pulley for transmitting the rotary motion of the apparatus. The upper end of the chamber $a$ has suitable openings, in order that the pressure in the interior shall remain constant.

$j$ is a pulley for guiding the cable or belt $l$.

When the wave rises into the chamber or tube $a$ through the tube $b$, the valve $e$ remains closed, as the pressure is greater outside than inside of the apparatus. Then when the water falls the valve $d$ opens and the apparatus is put in motion. When the wave falls, the motion-tube is emptied through the valve $e$, which opens, while the valve $d$ is closed. Thus a depression takes place at the open side of the apparatus, and the pressure existing at the other side, acting against this depression, imparts motion to the apparatus in the same direction as before. This second motive action is even more powerful than the first one, as no internal resistance is offered to the liquid as it moves.

The apparatus is inexpensive, efficient in action, conveniently applied, and very easily managed.

It will be evident that such modifications in the construction of the apparatus may be made as experience may prove necessary without departing from the spirit of the invention.

I claim—

An apparatus for utilizing the motion of the waves, consisting in the combination of a central swiveled chamber, a, with a tube, b, that is in direct communication with chamber a, the tube b having valves d e, and of curved blades f, disposed around said chamber a, as hereinbefore described, and for the purpose specified.

The foregoing specification of my apparatus for utilizing the power of the waves signed by me this 25th day of May, 1886.

EMILE JOSEPH DELAURIER.

Witnesses:
ROBT. M. HOOPER,
ALBERT MOREAUX.